(12) United States Patent
Perenon et al.

(10) Patent No.: US 6,606,919 B2
(45) Date of Patent: Aug. 19, 2003

(54) FLATNESS MEASURING ROLLER

(75) Inventors: Remi Perenon, Villars (FR); Jean-Paul Faure, Eragny sur Oise (FR)

(73) Assignee: Vai Clecim, Nanterre cedex (FR)

( * ) Notice: Subject to any disclaimer, the term of this patent is extended or adjusted under 35 U.S.C. 154(b) by 0 days.

(21) Appl. No.: 09/908,490

(22) Filed: Jul. 19, 2001

(65) Prior Publication Data
US 2002/0092365 A1 Jul. 18, 2002

(30) Foreign Application Priority Data
Jul. 20, 2000 (FR) .......................................... 00 09543

(51) Int. Cl.$^7$ ................................................ G01L 1/04
(52) U.S. Cl. ................................................ 73/862.453
(58) Field of Search ...................... 73/862.9, 159, 73/862.41, 756; 72/241.6, 14.1, 11.7, 9.1, 8.7; 100/50; 374/50; 33/533; 356/600, 613; 280/477; 601/34; 250/227.21

(56) References Cited

U.S. PATENT DOCUMENTS

| 4,481,800 A | * | 11/1984 | Ruhl .............................. 72/10 |
| 4,836,680 A | * | 6/1989 | Troster et al. ............... 356/371 |
| 4,972,706 A | * | 11/1990 | Adolfsson et al. ............. 73/159 |
| 5,509,285 A | * | 4/1996 | Anbe ........................... 72/8.6 |
| 5,537,878 A | * | 7/1996 | Sendzimir et al. ...... 73/862.391 |
| 6,119,313 A | * | 9/2000 | Gohler ......................... 19/105 |
| 6,151,944 A | * | 11/2000 | Lecrivain ................... 72/241.6 |
| 6,212,960 B1 | * | 4/2001 | Durand-Texte et al. .. 73/862.07 |
| 6,286,349 B1 | * | 9/2001 | Muller et al. ................. 72/11.7 |
| 6,354,013 B1 | * | 3/2002 | Mucke et al. ................. 33/533 |

FOREIGN PATENT DOCUMENTS

| DE | 370 521 | 4/1983 |
| EP | 0 270 442 | 6/1988 |
| JP | 62-47529 | 3/1987 |

* cited by examiner

Primary Examiner—Max Noori
Assistant Examiner—Octavia Davis
(74) Attorney, Agent, or Firm—Arent Fox Kintner Plotkin & Kahn

(57) ABSTRACT

The invention relates to a roll (1) for measuring the flatness of a band (M) comprising a tubular body (12) with a cylindrical external face (11) and a number of sensors each consisting of a feeler (2) mounted in a housing (3) provided in a recess in the thickness of the tubular body (12) and closed by a protection wall (50) whose deformations are measured by the feeler (2).

According to the invention, each housing (3) is closed by a hollow piece in the shape of a lid (5) comprising a bottom made of an elastically deformable thin wall (50) and a peripheral part in the form of a bushing (53) encased without any clearance in the housing (3) and forming an embedding foot for the thin wall (50).

16 Claims, 2 Drawing Sheets

FLATNESS MEASURING ROLLER

The invention relates to a measuring roll for continuous measuring of the distribution of the stresses applied to a band, useable especially for detecting the flatness defects of a sheet metal.

When rolling metal bands and notably cold-rolled thin sheets, flatness defects appear, caused in particular by small variations over the width of the band, in the elongation produced by rolling.

There result flatness defects that can be corrected while acting on the rolling conditions and, in particular, in the transversal direction, of the clamping pressure applied between the working rolls.

In modern mills, indeed, it is possible to act locally on the distribution of the loads, for example by a thermal effect, by means of zones spraying systems, or by mechanical effect, while exerting curving loads on the ends of the working rolls. It is also possible to use a back-up roll comprising a deformable envelope mounted to rotate round a fixed shaft and resting on the said shaft by a number of actuators that may be adjusted in position and in pressure.

In order to detect the defects to be corrected, the band is made to run over a measuring device, placed downstream the mill, and sensitive to variations, over the width of the band, of the tension load applied to the said band.

Such a measuring device is composed, usually, of a deflector roll comprising a cylindrical body mounted to rotate round an axis perpendicular to the longitudinal running direction of the band that is applied under stress over an angular sector of that roll.

A number of sensors distributed on the external cylindrical face of the roll enable to measure the variations of the local application pressure of the band. Normally, these sensors are spaced apart from one another regularly and distributed over the whole length of the roll, whereas the band can be divided into a series of adjacent zones of width corresponding to the transversal spacing between the sensors.

On the other hand, to avoid any interference between the measures conducted on two adjacent zones, the sensors are advantageously staggered by a certain angle from one zone to the next.

In a known embodiment described, for example, in the document AT-B-370521, the deflector roll is composed of juxtaposed annular segments each composed of at least one load sensor located in a housing provided in the thickness of the segment and made of a piezoelectric transducer interposed between the bottom of the housing and a protection part that closes the housing outwardly.

Such an arrangement enables good dissociation of the measuring zones of the band, but it is difficult to ensure perfect junction between two adjacent segments. Therefore, there are risks of marking the band due to impurities build-ups along each jointing plane between two segments.

According to another embodiment, described in the document JP-A-62-047529, the deflector roll is composed of a tubular body in which are drilled a number of radial bores each forming a housing for a cylindrical casing whose bottom consists of a thin wall that is tangentially aligned with the external face of the tubular body. A magnetostriction-type sensor is applied to the internal face of that wall.

Thus, in both cases, each measuring zone is associated with a load sensor on which pressure applied by the band is transmitted by the closing wall. The inherent resistance of that wall, which is interposed between the sensor and the band may affect the measure of the pression in a manner which is difficult to appreciate. Besides, the measure can be disturbed too by external influences resulting for example from the expansion of the roll due to the temperature of the band or its deformation under the effect of the loads applied which may induce jamming of the protection wall.

To avoid these perturbations, a small clearance can be left at the periphery of the closing wall, but there is still a risk of marking caused by the build-up of impurities along the edge of the wall.

Such drawbacks may be avoided with another type of flatness measuring roll which has been developed by the applicant since many years, such a roll using the deformation of the protecting wall for determining by calculation the variation of the pressure applied by the band.

Thus, instead of disturbing the measure of the pressure, the wall covering the sensor becomes a means for directly measuring these pressure.

To this aim, we do not use load sensors but displacement sensors measuring directly, in each sensitive zone, the deflection resulting from the pressure applied. Then, by applying the formulas of Resistance of Materials, it is possible to determine by calculation the variations of that pressure from the measurement of the deflection and this calculation does not risk to be affected by external perturbations, since the measuring feelers can be calibrated while performing a blank measurement in order to take into account solely the deformation caused by the loads applied by the band.

On the other hand, to avoid any risks of marking, it has been suggested to cover the whole roll with a continuous surface. In such an arrangement described, for instance, in the European patents EP-028.191 or EP-0.270.442 of the same company, the deflector roll comprises a central body composed of a tubular wall that is thick enough to confer the necessary resistance and on which is attached a continuous thin envelope that is, generally applied by hooping, whereas the sensors are located in bores provided in the central body, and closed outwardly by the corresponding section of the thin envelope.

This section of the envelope forms a sensitive zone and it can be considered generally that the said zone behaves like a thin plate, normally circular, and fixed along its periphery, whereas this plate is subject to uniform pressure. We now that, in such a case, the deflection in the centre of the plate is given by a formula of the type:

$$f = KpD^2/e^3 \qquad (1)$$

where D is the diameter of the plate and (e) its thickness.

As the measuring zone is sized for a determined sensitiveness, it appears that the deflection (f) measured in the centre of the plate by the feeler is proportional to the pressure applied (p) that is itself proportional to the traction of the band, in the corresponding zone.

On each measuring zone, the deflection is measured by comparing in the positions of the mobile element of the feeler in the centre of the plate, respectively when empty and when loaded. It is thus possible, while comparing the measurements conducted by the different sensors, to determine the variations of the traction load in adjacent zones distributed over the width of the band.

Using a thin envelope covering the whole roll advantageously eliminates, as seen, any risks of marking. However, mounting the said by hot hooping is rather complex.

On the other hand, deterioration and wear of the external face of the roll, on which the band is applied under traction and runs at high speed, cannot be avoided. Periodically, it is thus necessary to rectify this face and even to replace the envelope in case of excessive wear and, to do so, first of all, all the sensors, must be disassembled. Even if we use an assembly on removable bars that is subject to the European patent 0.270.442 already mentioned, such operations are complex and costly since it is generally necessary to remove the deflector roll for a rather long period, which causes a production stoppage.

The purpose of the invention is to remedy these shortcomings thanks to a new arrangement enabling simplification of the design of the roller and of the maintenance operations and providing, in particular, the opportunity of intervening punctually on either sensor without dismantling the assembly.

The invention relates therefore generally to a roll for measuring the distribution of the loads on a band running along a longitudinal direction and applied to the said roll, the said roll comprising a tubular body mounted to rotate round an axis perpendicular to the running direction and carrying a number of measuring members sensitive to a local application pressure of the band and each mounted in a housing limited by a lateral face, closed outwardly by a wall with an external cylindrical face of same curving radius as the external face of the roller, whereas each measuring member is a feeler-type displacement sensor comprising a mobile element mounted to slide radially over a fixed element and applied outwardly to the internal face of the closing wall of the housing.

According to the invention, each housing of a sensor is closed individually by a hollow part in the shape of a lid with a bottom made of an elastically deformable thin wall and integral with a peripheral part in the form of a bushing delineated by two lateral faces, respectively internal and external, whereas the external face exhibits a profile, in cross section, identical with that of the lateral face of the housing, so that the lid is encased without any clearance into the said housing, in a position for which the external face of the bottom is situated in the extension of the external face of the roller, the lateral opposite faces of the housing and of the bushing being applied one onto the other along a sufficient height so that the said bushing forms a peripheral embedding means capable of resisting the deflection moments resulting from the pressure applied on the thin plate by the band, without any risks of separation along the joint between the external face of the lid and the external face of the tubular body.

In a particularly advantageous fashion, the internal lateral face of the embedding bushing connects, by a rounded fillet, to the internal face of the deformable plate on which the mobile element of the feeler rests.

According to a preferred embodiment, each lid of a housing is associated with a means for permanent application of lateral faces of the housing and of the bushing which are opposite to each other.

In a particularly advantageous fashion, this maintaining means is composed of a thrust part placed in the housing and protruding inside the bushing of the lid, whereas the said thrust part is delineated by a lateral face with an identical profile, in cross section, with that of the internal lateral face of the bushing, in order to provide between the said thrust part and the lateral face of the housing, an annular space in which the bushing of the lid is encased without any clearance, inwardly and outwardly.

According to another preferred characteristic, the thrust part is delineated, outwardly, by a front end face, spaced from the internal face of the ductile thin wall by a slight clearance corresponding to a maximum deformation in the elastic range of the thin wall under the effect of a local application pressure of the band, and on which rests the said thin wall in case of excessive pressure, whereby the said front face is drilled with a passage orifice with a certain play of the mobile element of the feeler.

On the other hand, the thrust part can be fitted, at the bottom of the housing, with a flared section forming a peripheral rim on which rests the embedding bushing of the lid, in the engaged position of the said lid for which the external face of the thin wall lies in the extension of the external face of the tubular body, whereby the internal lateral face of the bushing is delineated by a groove exhibiting an annular bottom on which rests the peripheral rim of the thrust part. Thus, the embedding bushing of the lid bears against the bottom of the housing at its internal lateral face, which promotes the embedding effect.

Thanks to these arrangements, the lid can be embedded simply with a little strength in the annular space between the thrust part and the lateral face of the housing. However, the lateral faces opposite the embedding bushing of the lid and of the thrust part can be glued to one another, whereas both parts can be easily disassembled as a whole in order to allow for punctual intervention in a measurement area without having to disassemble all the feelers.

Other advantageous characteristics are the subject of secondary claims.

But the invention will be understood better by the following description of a particular embodiment, given for exemplification purpose and represented on the appended drawings.

FIG. 1 represents a cross sectional view of a flatness measuring roller 1 that makes up, as usual, a deflector roll of a sheet metal (M) that runs along a longitudinal direction perpendicular to the rotational axis 10 of the roll and winds around an angular sector A of the said roll.

The band (M) is held under traction and is therefore applied to the external surface 11 of the roller 1 under a pressure that is given by the formula:

$$p = T/R \qquad (2)$$

where (T) is the traction load by bandwidth unit and (R) the radius of the external face 11 of the roller.

The deflector roll according to the invention is of the type with displacement sensors, as described in the European patent EP-0.028.191 of the same company. It is therefore fitted with a number of sensors that are spaced from one another transversally and at a certain angle. As stated in the previous patent EP-0.028.191, the different sensors are advantageously distributed on a helical curve that winds around the external face of the deflector roll. Each displacement sensor is associated with a deformable wall forming a zone of width (l) sensitive to the pressure applied by a corresponding elementary zone of the band. Two adjacent sensors C1, C2 are therefore staggered, transversally, by the same distance (l).

Figure 1:
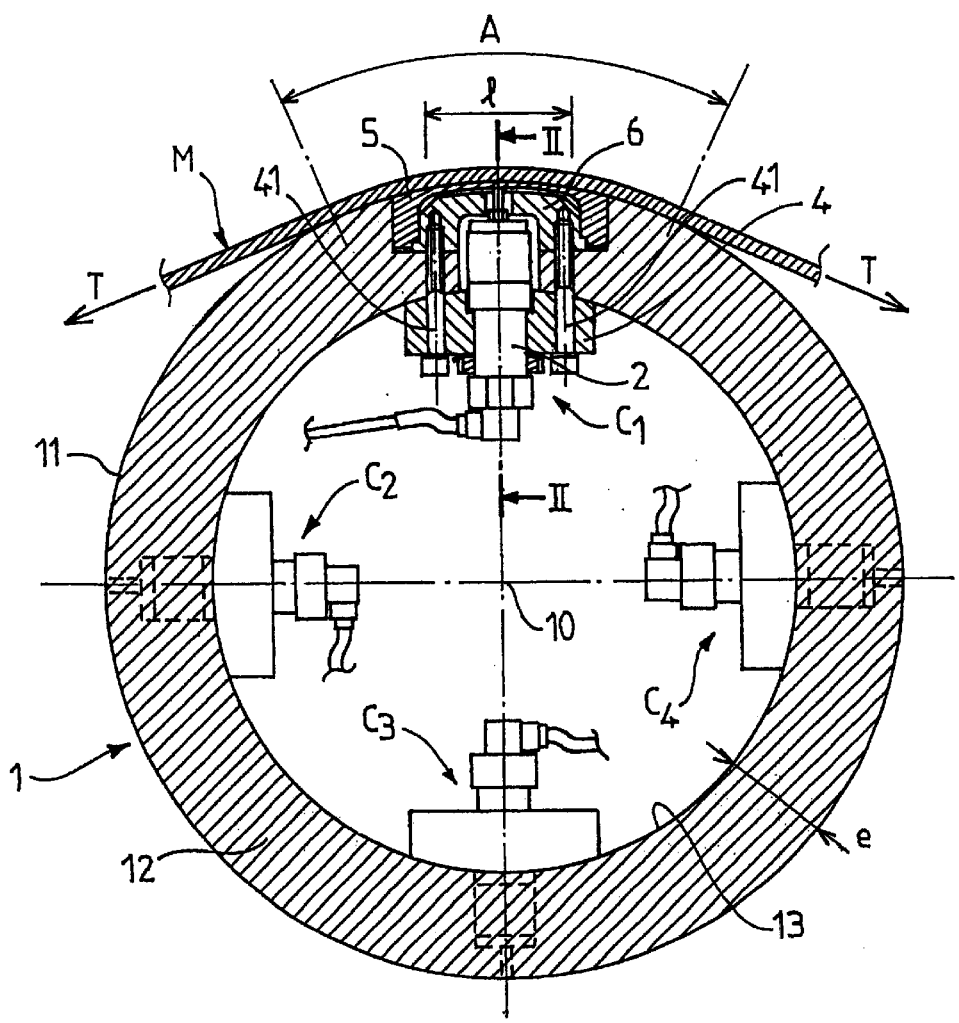
FIG. 1 is a cross sectional view of a measuring roller according to the invention.

In the embodiment represented on FIG. 1, the deflector roll 1 is fitted with four series of displacement sensors centred on two perpendicular diametral planes. The pitch (L) of the helix must therefore be four times the width (l) of a sensitive zone to cover the whole width of the band without losing any information. However, it can also be reduced in order to increase the resolution of the roller.

Obviously, signal processing means enable to differentiate the measurements conducted by the sensors.

Generally, each sensor is therefore associated with a sensitive zone, of width (l) provided on the surface of the roller and whose deformations are measured by a feeler 2.

The roller 1 comprises a tubular body 12 made up of a wall with sufficient thickness (e) to sustain the deflection loads resulting from the application of the band under traction. Each feeler 2 is mounted in the centre of a housing 3 comprising a bore 31 provided radially in the tubular body 12 and that emerges, outwardly, in a countersink 32 centred on the axis 30 of the bore 31 and provided on a portion of the thickness (e) of the roller. This countersink 32 is therefore delineated by a plane annular bottom 33 perpendicular to the axis 30 of the bore 31 and a lateral wall 34 at right angle to the bottom 33. Normally, the countersink 32 is circular and the lateral wall 34 exhibits a cylindrical profile centred on the axis 30 and with a diameter (d) greater than the width (l) of an elementary measuring zone of the band.

Each feeler 2 comprises a fixed element 21 that is attached with a certain clearance in the bore 31 of the tubular body 12 and in which is mounted to slide axially a mobile element 22 that emerges outwardly in the countersink 32, when the feeler 2 is fixed to the roller.

Preferably, according to the arrangement described in the patent EP-0.270.442; the feelers of a same series are mounted on a bar 4 extending transversally over the whole width of the roller and applied to the internal face 13 of the tubular body 12, whereas the bar 4 is fitted with a cylindrical application face with matching profile.

It is thus possible to fix in advance the feelers 2 of the same series on a bar 4 that is attached inside the roller and fixed to the internal face 13 of the said roller by screws 41.

As stated, the invention enables to eliminate the thin hooped envelope that, in the previous arrangements, covered the tubular body 12 completely. In the invention, conversely, the band M is applied directly to the cylindrical external face 11 of the tubular body 12 and each countersink 3 in which a feeler 2 is placed emerges on that external face 11, through an orifice 35 that is closed by a lid 5 with a cylindrical external face 51 having the same curving radius as the external face 11 of the tubular body and that is placed in the extension of the said external face to restore the continuity of the surface of the roller, when the lid 5 is inserted into the countersink 32.

Figure 5:
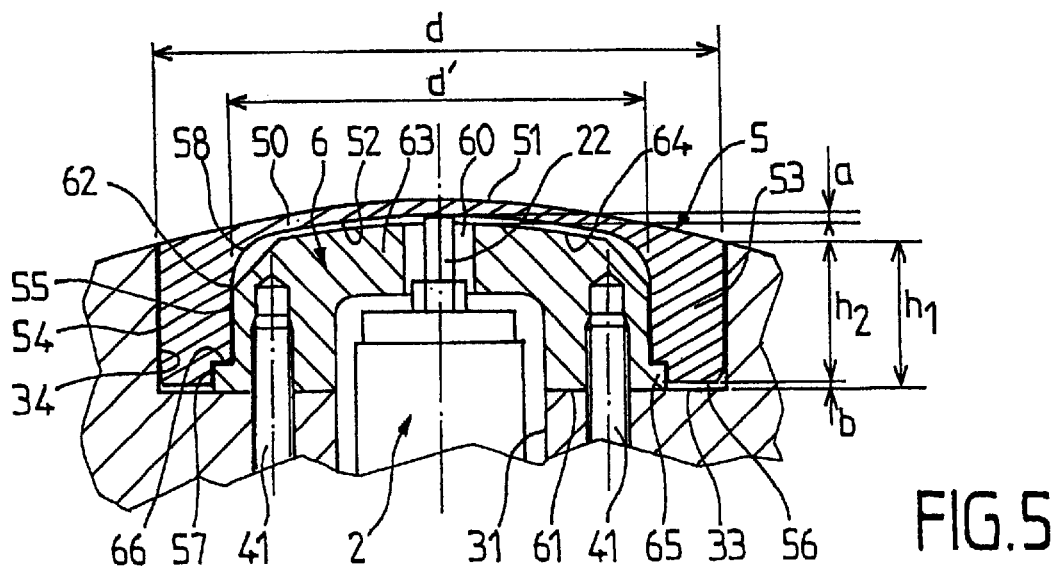
FIG. 5 is a detailed view, at enlarged scale, of a measuring area.

As indicated in detail on FIG. 5, each lid 5 makes up a hollow part in the form of a cap comprising a bottom 50 composed of a thin wall with an external face 51 and an internal face 52 and a lateral portion 53 consisting of a cylindrical bushing with two lateral faces, respectively external 54 and internal 55, and an end face 56.

The external lateral face 54 of the lid 5 has a diameter (d) exactly equal to the diameter of the lateral face 34 of the countersink 32 so that the bushing 53 of the lid 5 is embedded without any clearance into the countersink 32 until its end 56 rests on the bottom 33 of the countersink in an engaged position for which the external face 51 of the lid 5 lies exactly in the extension of the external face 11 of the tubular body 12.

In that position, both lateral faces 54 and 34 which are opposite on respectively the lid 5 and countersink 32 are fitted one inside the other. The sizes of the bushing 53, respectively its thickness e1 and its height h2, are determined so that the thin wall 50 behaves like a circular plate fixed along its periphery by the bushing 53 whereas none of whose portions may rotate under the effect of the moments resulting from the pressure applied to the thin wall 50 and which forms thus a peripheral embedding foot of the deformable wall 50.

The mobile element 22 of the feeler 2 is applied to the internal face 52 of the thin wall 50 and detects therefore exactly the deformations of the said wall. As stated, since the wall 50 is fixed on its periphery, the deflection (f) measured by the feeler is proportional to the pressure (p) itself proportional to the action applied to the band in the corresponding zone of the said.

To do so, the external lateral face 54 of the bushing 53 must be maintained permanently against the lateral face 34 of the countersink 32.

To this end, in the preferred embodiment represented on the drawings, the bushing 53 is nested without any clearance, not only outwardly on the lateral face 34 of the countersink, but also inwardly on a thrust part 6 fixed in the centre of the housing 3 of the feeler 2.

This thrust part 6 has the shape of a hollowed cap with one end 61 forming a bearing annular plane face on an internal section of the annular bottom 33 of the countersink 32 and a cylindrical lateral face 62 having a diameter (d') identical with that of the internal lateral face 55 of the bushing 53.

Figure 4:
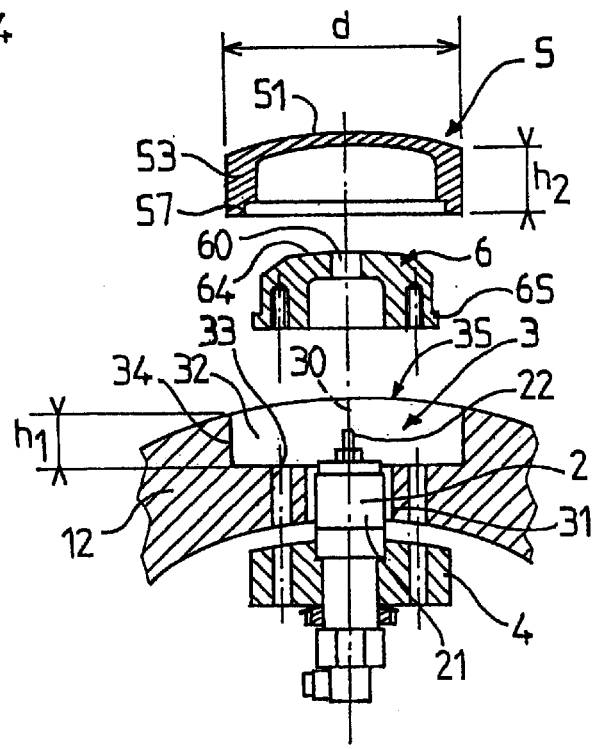
FIG. 4 shows, as a cross sectional view, all the parts of the sensor before assembly.

As shown on FIG. 4, the thrust part 6 protrudes therefore in the centre of the housing provided by the countersink 32 while leaving, between the lateral face 34 of the countersink and the lateral face 62 of the thrust part, an annular space whose width is exactly equal to the thickness e1 of the bushing 53 that is embedded therefore without any clearance between the said lateral faces 34 and 62.

The thrust part 6 whose thickness may be relatively large, opposes any separation tendency from the lateral faces 54 and 34 opposite the bushing and the countersink, respectively, and hence guarantees correct fixing, along its periphery, of the thin wall 50.

On the other hand, the thrust part 6 is hollowed in order to provide an internal space located in the extension of the bore 31 of the tubular body and closed by a bottom 63 drilled with an orifice 60 for the passage of the mobile element 22 of the feeler 2 that is applied to the internal face 52 of the wall 50.

To ensure proportionality between the pressure applied by the band M and the deflection (f) measured by the feeler 2, it is necessary that the thin wall 50 warps while remaining in an elastic range. To this aim, it is interesting to restrict the deformations of the thin wall 50 and, thus, the bottom 63 of the thrust part 6 is delineated by an end front face 64 substantially parallel to the internal face 52 of the thin wall 50 and spaced from the said by a slight clearance (a) determined so that the thin wall 50 can be deformed under the effect of the local application pressure of the band while remaining in the elastic range and, in case of excessive pressure, rests on the end face 64 of the thrust part 6.

Besides, the thrust part 6 comprises, at its end 61, a flared portion forming a collar 65 that engages into a circular groove 57 provided on the internal edge of the end face 56 of the bushing 53.

Thus, when the lid 5 is nested in the annular space between the thrust part 6 and the lateral face 34 of the countersink 32, the bottom of the groove 57 rests on an annular face 66 of the collar 65 whose height is determined so that, in that position, there remains a slight clearance (b) between the end face 56 of the bushing 53 and the bottom 33 of the countersink 32, whereas the height (h1) of the bushing 53 is slightly smaller than the depth (h2) of the countersink 32.

Thus, the lid 5 rests on the bottom of the countersink 32 along the internal lateral face 55 of the bushing 53, which increases the application effect of the external lateral face 54 of the said bushing against the lateral face 34 of the countersink 32. To ensure perfect continuity of the external face 11 of the roller while avoiding any risks of separation and, consequently, of impurity build-up along the junction between the lid 5 and the tubular body 12, it is not necessary to weld the edge of the lid 5, since the latter can be simply inserted forcibly into the countersink 32.

The deformable wall 50 forms therefore an elastic circular plate fixed on its periphery and provides a sensitive zone of diameter (l) whose deflection measured by the feeler 2 is proportional to the tension load (T) applied in the corresponding section, of width (l), of the band (M).

Figure 3:
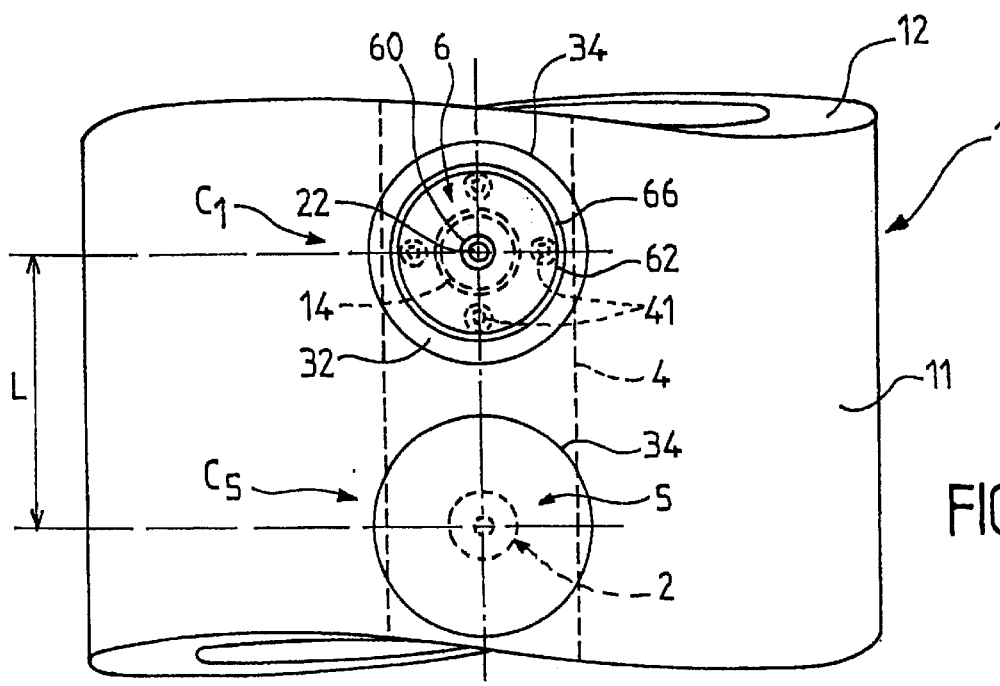
FIG. 3 is a bottom view of a portion of the roller, after removing the lid of a sensor.
Figure 2:
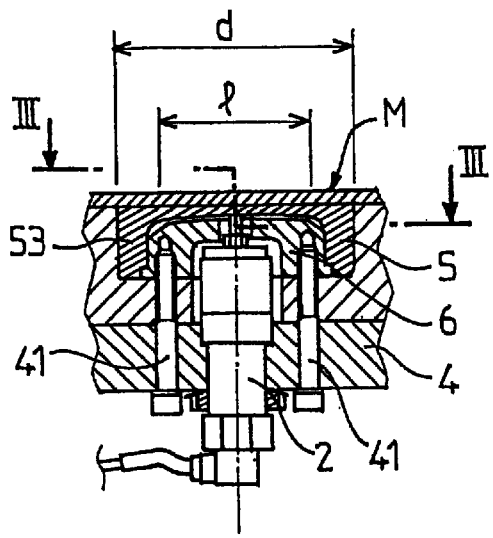
FIG. 2 is a longitudinal sectional view, along II—II of FIG. 1, of a measuring sensor assembly.

In the embodiment represented on FIG. 1, the roller 1 is fitted with four series of sensors C1, C2, C3, C4 arranged in a helical fashion. As shown on FIG. 3, the offset (L) between two sensors C1, C5 of a same series can be smaller than four times the diameter (l) of the embedded wall 50, in order to improve the resolution of measurement.

As indicated on the figures, the thrust part 6 can be fixed on the bottom 33 of the countersink 32 by the fastening screws 41 of the bar 4 on which the feelers 2 are mounted. The thrust part 6 is then simply fitted with threaded bores located in the extension of the bores provided in the tubular body 12 for the engagement of the screws 41. As shown on FIG. 3, each thrust part 6 can be fixed by four screws 41 distributed around the axis of the feeler 2.

To enhance the fixing effect, along its periphery, of the thin wall 50 and to avoid concentrations of stresses, the internal face 52 of the wall 50 connects to the internal lateral face 55 of the bushing 53 by a rounded fillet 58 and the lateral face 62 of the thrust part 6 is delineated by a corresponding cut face and thus maintains the internal lateral face 55 of the bushing 53 over its whole height.

Obviously, the diameter (l) of the sensitive zone is substantially smaller than the diameter (d) of the countersink 32, the spacing pitch of the sensors being adjusted accordingly.

The lid 5 is encased without any clearance in the countersink 32 and is maintained by the thrust part 6. To this aim, the opposite lateral faces 55 of the lid and 62 of the thrust part 6 can be glued using an adhesive binder, whereas both parts can be disassembled together from the outside.

The arrangements according to the invention enable therefore to ensure fixing, by its periphery, of the sensitive plate 50, without any risk of separation along the edge of the recess 3 and, thus, to guarantee the continuity of the external face of the roller.

On the other hand, the lid 5 is not welded, but simply encased and can hence be disassembled easily. To do so, it suffices to loosen the screws 41 of the lid corresponding only to the sensitive zone to be checked, whereas the bar 4 remains fixed to the tubular wall 2 by the fastening screws of the lids of the other sensors.

It is therefore possible to intervene on an individual sensor without having to disassemble the series of feelers carried by a bar 4.

In case of deterioration of a sensitive zone, it suffices to dismantle and to replace the corresponding lid whereas, in the previously known rolls having a hooped envelope, the said envelope had to be destroyed by machining and replaced with a new one.

Obviously, the invention is not limited to the details of the embodiment that has just been described for exemplification purposes, whereas other equivalent arrangements can be used without departing from the protection framework defined by the claims.

In particular, other means can be employed to fix the lid 5 removably in the countersink 32.

For instance, the lid 5 could be screwed to the thrust part 6, whereas the lateral faces 55 and 62 opposite the bushing 53 and the thrust part can be fitted with matching threads.

Pins inserted into aligned bores provided in the lid 5 and the thrust part 6, perpendicular to the axis of the sensor, could be used too.

Moreover, the lid 5 could be fixed directly to the bottom of the countersink 32, whereby the thrust part 6 stays in place.

Moreover, other means such as, for instance, a clamping member such as an expansible chuck, could be used as maintaining means to guarantee the application one onto the other of the lateral faces 54 and 34 of the lid and of the countersink 32.

On the other hand, it is advantageous to fit the sensors on bars, as described in the patent EP-0.270.442 already mentioned, but other means for fixing the feelers on the tubular body could be used too.

The reference signs inserted after the technical characteristics mentioned in the claims solely aim at facilitating the understanding of the latter and do not limit their extent in any way.

What is claimed is:

1. A roll for measuring the distribution of the stresses on a band running along a longitudinal direction and applied to said roll, said roll comprising a tubular body mounted to rotate round an axis perpendicular to the running direction and carrying a number of measuring members sensitive to a local application pressure of the band, each measuring member being mounted in a housing limited by a lateral face, closed outwardly by a wall having an external face and an internal face, wherein each measuring member is a feeler-type displacement sensor comprising a mobile element mounted to slide radially over a fixed element and applied outwardly to the internal face of the closing wall of the housing, wherein each housing of one measuring member is closed individually by a hollow part in the shape of a lid with a bottom made of an elastically deformable thin plate and integral with a peripheral part in the form of a bushing delineated by two lateral faces, respectively internal and external, wherein the external face exhibits a profile, in cross section, identical with that of the lateral face of the housing, so that the lid is encased without any clearance into said housing, in a position for which the external face of the bottom is situated in the extension of the external face of the roll, the opposite lateral faces of the housing and the bushing being applied one onto the other along a sufficient height so that the said bushing forms a peripheral embedding means capable of resisting the deflection moments resulting from the pressure applied to the thin plate by the band, without any risks of separation along the joint between the external face of the lid and the external face of the tubular body.

2. A measuring roll according to claim 1, wherein the internal lateral face of the embedding bushing connects, by a rounded fillet, to the internal face of the deformable thin plate on which the mobile element of the measuring member rests.

3. A measuring roll according to claim 1, wherein each housing comprises a radial bore in which the measuring member is mounted and that emerges in the center of an annular face parallel to the axis of the roller and making up the bottom of a countersink provided on the external face of the tubular body and in which the lid is encased without any clearance.

4. A measuring roll according to claim 1 characterized in that the height and the thickness of the bushing are determined so that said bushing itself constitutes after encasing the lid, a peripheral fixing means for the thin plate constituting the bottom of the lid.

5. A measuring roll according to claim 1, wherein each lid of a housing is associated with a means for permanently applying the opposite lateral faces of the housing and of the bushing over one another.

6. A measuring roll according to claim 4, wherein the means for permanently applying on another the opposite faces of the bushing and of the housing comprises a thrust part placed in the housing and protruding inside the bushing of the lid, said thrust part being delineated by a lateral face with an identical profile, in cross section, with that of the internal lateral face of the bushing, in order to provide between said thrust part and the lateral face of the housing, an annular space in which the bushing of the lid is encased without any clearance, inwardly and outwardly.

7. A measuring roll according to claim 6, wherein the thrust part is delineated, outwardly, by a front end face, spaced from the internal face of the deformable thin plate by a slight clearance corresponding to a maximum deformation in the elastic range of the thin plate under the effect of a local application pressure of the band, and on which rests the thin plate in case of excessive pressure, wherein said front face is drilled with a passage orifice with a certain play of the mobile element of the measuring member.

8. A measuring roll according to claim 6, wherein the thrust part is applied to a back-up face parallel to the axis of the roller and making up the bottom of the housing in which the lid is encased.

9. A measuring roll according to claim 7, wherein the thrust part is fitted, at the bottom of the housing, with a flared section forming a collar on which rests the embedding bushing of the lid in the encased position of the lid, for which the external face of the thin plate lies in the extension of the external face of the roller.

10. A measuring roll according to claim 9, wherein the internal lateral face of the embedding bushing of the lid is surrounded by a groove with an annular bottom resting on the collar of the thrust part, in the engaged position of the lid, wherein the end of the bushing remains separated from the bottom of the lid by a slight clearance.

11. A measuring roll according to one of claims 6 to 10, wherein the embedding bushing of the lid is inserted forcibly in the annular space between the thrust part and the lateral face of the housing.

12. A measuring roll according to one of claims 6 to 10, wherein the internal lateral face of the embedding bushing of the lid is glued by an adhesive binder on the lateral face of the thrust part.

13. A measuring roll according to one of claims 6 to 10, wherein the internal lateral face of the embedding bushing and the lateral face of the thrust part are fitted with matching threads, wherein the protection lid is screwed on the thrust part.

14. A measuring roll according to claim 8, wherein the thrust part is fixed removably to the bottom of the housing in which the lid is encased.

15. A measuring roll according to claim 14, wherein the housing for each lid of a sensor comprises a countersink with an annular bottom surrounding a central bore in which the measuring member is mounted; and the thrust part is a hollow part in the form of a cap with a central recess in the extension of the bore and closed by a bottom drilled with a passage orifice of the mobile element of the measuring member and resting on an internal section of the annular bottom of the countersink by an end annular face in order to leave, between the lateral face of the countersink and the lateral face of the thrust part, an annular space for encasing the embedding bushing of the lid.

16. A measuring roll according to claim 14, wherein each measuring member is introduced from the inside of the tubular body into a radial bore and is mounted on a supporting bar fixed removably on the tubular body by screws emerging in the annular bottom of the countersink; and the back-up face of the thrust part applied to the bottom around the passage bore of the feeler, is fitted with threaded bores in which engage the fastening screws of the supporting bar of the measuring members, in order to ensure simultaneous fastening of the bar and of all the thrust parts distributed over the length of the roller, wherein each lid of a sensor can be dismantled with the corresponding thrust part independently of the other sensors.

* * * * *